United States Patent
Manning et al.

(10) Patent No.: US 7,624,300 B2
(45) Date of Patent: Nov. 24, 2009

(54) MANAGING STORAGE STABILITY

(75) Inventors: Michael Manning, Hopkinton, MA (US); Ashok Tamilarasan, Framingham, MA (US)

(73) Assignee: EMC Corporation, Hopkinton, MA (US)

(*) Notice: Subject to any disclaimer, the term of this patent is extended or adjusted under 35 U.S.C. 154(b) by 430 days.

(21) Appl. No.: 11/640,668

(22) Filed: Dec. 18, 2006

(65) Prior Publication Data

US 2008/0148094 A1 Jun. 19, 2008

(51) Int. Cl.
*G06F 11/00* (2006.01)
(52) U.S. Cl. .......................................................... 714/7
(58) Field of Classification Search ........................ None
See application file for complete search history.

(56) References Cited

U.S. PATENT DOCUMENTS

| | | | |
|---|---|---|---|
| 5,278,838 A * | 1/1994 | Ng et al. ........................ 714/6 |
| 5,644,697 A | 7/1997 | Matsumoto et al. |
| 6,567,892 B1 | 5/2003 | Horst et al. |
| 6,799,283 B1 * | 9/2004 | Tamai et al. .................... 714/6 |
| 6,859,890 B2 * | 2/2005 | Humlicek et al. ............... 714/9 |
| 6,886,108 B2 * | 4/2005 | Talagala ........................ 714/5 |
| 7,409,582 B2 * | 8/2008 | McNeill et al. ................. 714/6 |
| 2003/0005354 A1 | 1/2003 | Kalman |
| 2006/0161805 A1 | 7/2006 | Tseng et al. |
| 2007/0180292 A1 * | 8/2007 | Bhugra ........................ 714/6 |

OTHER PUBLICATIONS

International Serach Report.
Written Opinion of ISA.

* cited by examiner

*Primary Examiner*—Michael C Maskulinski

(57) ABSTRACT

Storage stability is managed. It is detected that a disk drive is requesting to be taken offline. The disk drive is begun to be treated as being in a probation state. If within an acceptable period of time the disk drive requests to be put back online, treatment of the disk drive as being in a probation state is stopped, and only any portions of the disk drive data that were the subject of write requests involving the disk drive while the disk drive was being treated as being in a probation state are rebuilt.

15 Claims, 2 Drawing Sheets

MANAGING STORAGE STABILITY

TECHNICAL FIELD

This invention relates to managing storage stability.

BACKGROUND

In a complex system such as a computer processor based system, if an error is detected frequently, system reliability may be poor even if the error is due to an intermittent fault. The component having an intermittent fault which is detected frequently may eventually cause a fatal fault even if the component does not have a fatal fault. Also, the component lowers system reliability and requires time for recovering the fault (e.g., correcting the error), thereby deteriorating the system performance.

As is known in the art, large host computers and servers (collectively referred to herein as "host computer/servers") require large capacity data storage systems. These large computer/servers generally include data processors, which perform many operations on data introduced to the host computer/server through peripherals including the data storage system. The results of these operations are output to peripherals, including the storage system.

One type of data storage system is a magnetic disk storage system. Here an array or bank of disk drives and the host computer/server are coupled together through a system interface. The interface includes "front end" or host computer/server controllers and "back-end" or disk controllers. The interface operates the controllers in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

Given the large number of disk drives in a typical implementation, there is a reasonable likelihood that one or more disk drives will experience an operational problem that either degrades drive read-write performance or causes a drive failure. This is because disk drives are complex electromechanical systems. Sophisticated firmware and software are required for the drive to operate with other components in the storage system. The drives further incorporate moving parts and magnetic heads which are sensitive to particulate contamination, and electrostatic discharge (ESD). There can be defects in the media, rotational vibration effects, failures relating to the motors and bearings, and other hardware components or connections. Some problems arise with respect to drive firmware or drive circuitry. Environmental factors such as temperature and altitude can also affect the performance of the disk drive. Thus, drives can fail and the failure can be significant if there is a nonperformance of the drive.

Many disk drives used in data storage systems include firmware/processor which monitors the performance and operation of the disk drive. If such firmware/processor detects a fault in such operation, it sets a bit in a register in the disk drive and takes such disk drive in a bypass state (i.e., off-line) (also known as bypass condition) for a short period of time, typically in the order of, for example, 200 milliseconds, thereby disabling its access by the host computer. More particularly, the system interface includes a diagnostic section (which may be included within the controllers) which regularly polls (i.e., inspects) at a rate of typically 500 milliseconds, for example, the state of the bit register in each of the disk drives. In one system, whenever the diagnostic section detects that the bit register in a disk drive has been set, i.e., the disk drive is in a bypass condition, such bypass condition is reported to the system interface control section (i.e., the controllers) thereby advising the controllers to no longer access (i.e., write to or read data from), the bypassed disk drive. It is noted that the diagnostics, when it detects a bypass condition, i.e., a set bit, does not know whether the bypass is only temporary or permanent. That is, the diagnostics does not know whether the disk drive will have its bypass condition removed and thereby again be operational. The polling continues and if the disk drive bypass condition is removed, the system interface commences a rebuilding of data operation using error correction and detection codes (i.e., a data reconstruction operation). If during the rebuilding process, a new poll indicates that the disk drive is again in a bypass condition, the system interface must again re-start the data rebuilding process. Further, once the disk drive is placed in a non-accessible condition, the system interface commences the rebuilding of data operation using error correction and detection codes and using a spare disk drive in the array or bank of disk drives, sometimes referred to as a "hot spare" disk drive, to immediately and automatically replace the bypassed disk drive. Thus, once a hot space switches into the system, the data reconstruction must be made using the hot spare before the data can be re-written from the hot spare back into the bypassed, and now perhaps physically replaced disk drive. This process can take from between 30 minutes to perhaps several days. Thus, the possibility of repeated response to bypass condition bits by the disk drive reduced the efficiency of the data storage system and leaves the data vulnerable to data loss should a second fault occur.

SUMMARY

Storage stability is managed. It is detected that a disk drive is requesting to be taken offline. The disk drive is begun to be treated as being in a probation state. If within an acceptable period of time the disk drive requests to be put back online, treatment of the disk drive as being in a probation state is stopped, and only any portions of the disk drive data that were the subject of write requests involving the disk drive while the disk drive was being treated as being in a probation state are rebuilt.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

As described below, when a drive requests to be taken offline (i.e., indicates a bypass condition), it is marked as probational, and only its sectors to which I/O writes are directed are later rebuilt.

Figure 1:
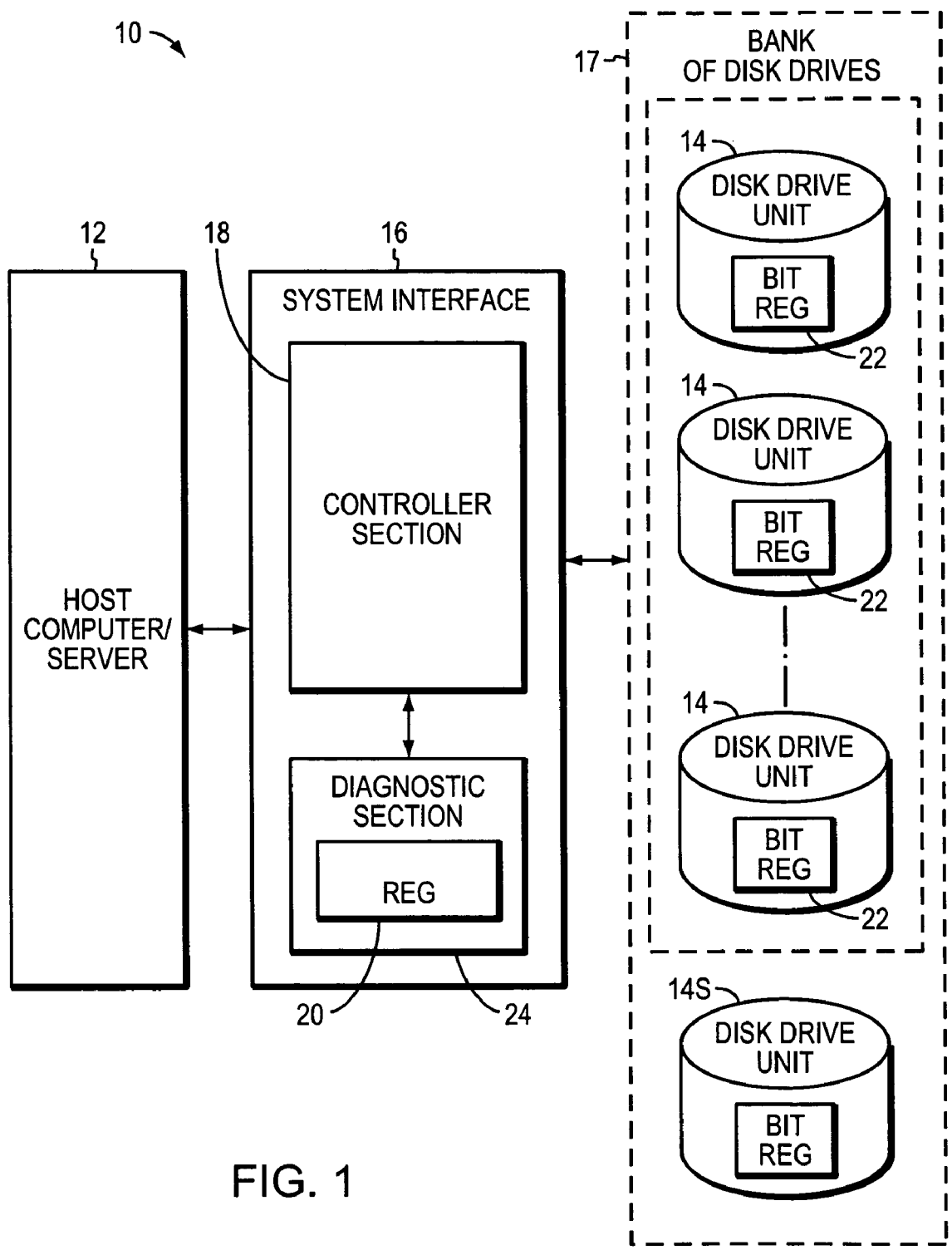
FIG. 1 is a block diagram of a system adapted to operate in accordance with the present invention.

Referring now to FIG. 1 a data storage system 10 is shown having a host computer/server 12 coupled to a bank or array of disk 14 drives through a system interface 16. The system interface includes a plurality of front-end controllers coupled to the host computer/server and back end directors coupled to the bank of disk drives in a controller section 18. A diagnostic section 20 is shown, it being noted that the diagnostic section 20 may be separate from the controller section 18 or may be distributed within the plurality of controllers. It is noted that one of the disk drives 14 in the bank 17 of disk drives 14 may be a hot spare disk drive 14S.

It is noted that each one of the disk drives 14 includes firmware/processor, not shown, for controlling the disk drive 14 in any conventional manner, it being noted that each disk drive includes a bit register 22 for storing a bit when such disk drive has been placed by the disk drive firmware/processor in a bypass or down condition. In the absence of this bit, the disk drive 14 considers itself operational and available to the system interface 16.

The diagnostic section 20 includes a register 24 for each one of the disk drives 14. Each one of the registers 24 is available to store a disk access inhibitor flag when the system interface 16 determines that the disk drive 14 corresponding to such register 24 is not available to the controllers in the system interface 16 for either storing data from the host computer/server 12 or for reading data from the disk drive 14 requested by the host computer/server 12. Thus, while the disk drives 14 themselves have their own firmware/processor for determining whether such disk drive 14 should be placed in a bypass condition and hence in a "down" or inoperative condition, the system interface 16 may, in accordance with a process to be described in more detail in connection with FIG. 2, determine that a disk drive 14 should be inaccessible for use by the system 10. In such case, i.e., that the disk drive 14 should be placed in an inaccessible condition, the system interface 16 sets the disk access inhibitor flag in the diagnostic section 20 register 24 associated with such inaccessible disk drive 14.

In some circumstances the system interface 16 may determine that the disk drive 14 corresponding to such register 24 should be placed in a probation state (in at least some implementations each one of the registers 24 is also available to store a disk probation flag to so indicate.) When the disk drive 14 is in the probation state, the disk drive 14 is not available to the controllers in the system interface 16 for either storing data from the host computer/server 12 or for reading data from the disk drive 14 requested by the host computer/server 12, but the system interface acts to allow I/Os involving the drive to be completed. In particular, the system interface allows I/O reads and writes to be completed without any interaction with the disk drive 14. In the case of I/O reads, existing Redundant Array of Independent Disks (RAID) functionality or other data protection functionality is relied on in correctly serving up the data by requested by the host computer/server 12, without the benefit of disk drive 14. In the case of I/O writes, the system interface writes nothing to the disk drive 14 but keeps track of which sectors of disk drive 14 are the subject of I/O writes while the disk drive 14 is in the probation state. (After the probation state is no longer in effect, these sectors are rebuilt using existing RAID or other data protection functionality.)

Briefly in accordance with a disk drive handling technique, the system 10 puts the disk drive in a probation state whenever a disk drive 14 has placed itself in a bypass condition. The disk drive 14 operates to set a bit therein when the disk drive 14 has placed itself in a bypass condition. During each polling event, the system 10 determines: (1) whether the bit has been set; and (2) how the disk drive should be treated. Depending on various conditions as specified below, the disk drive 14 is optionally (1) made or left accessible to the system 10, (2) made or left inaccessible to the system 10, or (3) put or left in the probation state (options (1) and (2) also mean the probation state is no longer in effect).

In accordance with the technique, in the event the disk drive places itself in a bypass condition and this falls within the number of such events allowed within a tracking period (e.g., 1 event within 24 hours), the disk drive is put in a probation state for up to a probation period (e.g., 30 minutes). If the disk drive requests to be brought back online (i.e., takes itself out of the bypass condition) before expiration of the probation period, the disk drive is made accessible to the system 10 and its sectors are rebuilt as necessary according to sector tracking when the probation state was in force. If the disk drive requests to be brought back online after expiration of the probation period, the disk drive is made accessible to the system 10 but is treated as a new, unfamiliar disk drive and therefore is subject to normal processes such as rebuilding the entire drive's data.

In the event the disk drive places itself in a bypass condition and this exceeds the number of such events allowed within the tracking period, the disk drive is made inaccessible to the system 10. In at least some implementations, this may be done by use of the inhibitor flag described above.

This technique reduces the chance that the system 10 will unnecessarily perform a full rebuild of the disk drive, putting a burden on the storage system, and potentially causing a data unavailable/data loss situation in the event of another drive failure during the rebuild. This technique allows the storage system to accommodate temporary unavailability (self-bypassing) of a disk drive, e.g., as a result of the disk drive resetting itself after an error, or during a disk drive firmware upgrade, or when a power down or power off command is issued.

In particular, the technique allows I/Os to continue to be directed to the disk drive while it is temporarily offline (e.g., for up to 30 minutes), without generating I/O timeouts that could ultimately cause the disk drive to be deemed non-functional, and to be removed as such by direction of a device handler or other functionality that receives the timeouts.

Figure 2:
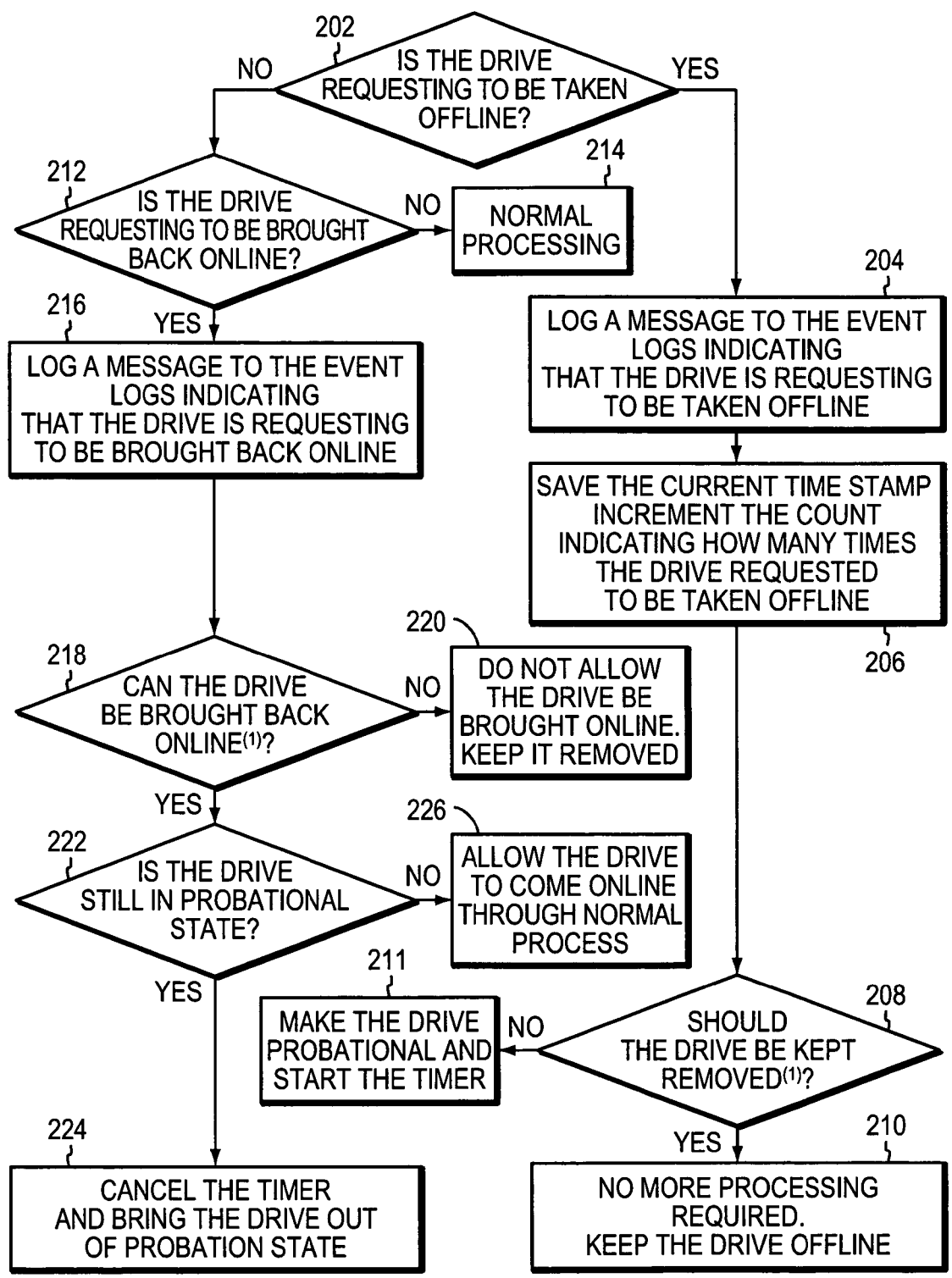
FIG. 2 is a flow diagram of the process in accordance with the invention.

Referring now to FIG. 2, a flow diagram of an example process of the technique is shown. As noted above, the diagnostic section 20 continuously polls each one of the disk drives 14; here the disk drives 14 are polled in parallel. Considering therefore one of the disk drives 14 and recognizing that the operation described below occurs concurrently for all disk drives 14, the diagnostic section 20 during each polling event, here once every 500 milliseconds, for example, determines whether such polled disk drive 14 has placed itself in a bypass condition by reading the bit register 22 therein.

Thus, considering one of the polling events, the process determines whether the polled disk drive 14 has placed itself in a bypass condition (i.e., requested to be taken offline), Step 202, by determining whether the bit register 22 in such disk drive 14 has been set. If the bit is set, the process logs a message indicating that the drive has requested to be bypassed, Step 204, and saves the current timestamp and increments a count indicating the number of times the drive has placed itself in a bypass condition, Step 206. The process determines whether the drive should be kept removed, Step 208, by determining whether within a 24 hour period it already placed itself in a bypass condition. If so, the drive is kept removed as a declared unstable drive, Step 210. If not, the drive is put into the probation state and a timer is started, Step 210.

If the drive has not placed itself in a bypass condition, it is determined whether the drive is requesting to be brought online, Step 212. If not, the event is complete with respect the drive, Step 214. If so, the process logs a message indicating that the drive has requested to be brought back online, Step 216. The process determines whether the drive can be brought back online, Step 218, by determining whether the drive has been declared unstable (because more than once within a 24 hour period it requested to be bypassed). If not, the drive is kept removed as a declared unstable drive, Step 220. If so, it is determined whether the drive's request to be brought back online is prior to expiration of a probation period, Step 222. If so, the probation period timer is cancelled, the drive is brought online, and its sectors are rebuilt as necessary according to sector tracking during probation, Step 224. Otherwise, the drive is brought online through normal processes (including full drive rebuilding if necessary), Step 226.

A number of embodiments of the invention have been described. Nevertheless, it will be understood that various modifications may be made without departing from the spirit and scope of the invention. Accordingly, other embodiments are within the scope of the following claims.

What is claimed is:

1. A method for use in managing storage stability, comprising:
    detecting that a disk drive is requesting to be taken offline;
    beginning treating the disk drive as being in a probation state; and
    if within an acceptable period of time the disk drive requests to be put back online,
        stopping treating the disk drive as being in a probation state, and
        rebuilding only any portions of the disk drive data that were the subject of write requests involving the disk drive while the disk drive was being treated as being in a probation state, further comprising:
    beginning treating the disk drive as being in a probation state only if the request falls within the number of such requests allowed within a tracking period.

2. The method of claim 1, further comprising:
    rebuilding only the sectors of the disk drive to which the write requests were directed.

3. The method of claim 1, further comprising:
    when the disk drive is treated as being in a probation state, making the disk drive not available for either storing data or for reading data; and
    when the disk drive is treated as being in a probation state, allowing the write requests involving the disk drive to be completed.

4. The method of claim 1, further comprising:
    when the disk drive is treated as being in a probation state, allowing the write requests to be completed without any interaction with the disk drive.

5. The method of claim 1, further comprising:
    when the disk drive is treated as being in a probation state, using data protection functionality in serving up data involving the disk drive.

6. The method of claim 1, further comprising:
    when the disk drive is treated as being in a probation state, keeping track of which sectors of the disk drive are the subject of the write requests.

7. A method of claim 1, further comprising:
    beginning treating the disk drive as being in a probation state only if the request is the only such request within a 24 hour period.

8. The method of claim 1, further comprising:
    treating the disk drive as being in a probation state for up to a probation period.

9. The method of claim 1, further comprising:
    treating the disk drive as being in a probation state for up to 30 minutes.

10. The method of claim 1, further comprising:
    polling the disk drive.

11. The method of claim 1, further comprising:
    reading a bit register at the disk drive to detect that the disk drive is requesting to be taken offline.

12. The method of claim 1, further comprising:
    logging a message indicating that the disk drive has requested to be taken offline.

13. The method of claim 1, further comprising:
    removing the disk drive as a declared unstable drive.

14. A method for use in managing storage stability, comprising:
    detection that a disk drive is requesting to be taken offline;
    beginning treating the desk drive as being in a probation state; and
    if within an acceptable period of time the disk drive requests to be put back online,
        stopping treating the disk drive as being in a probation state, and
    rebuilding only any portions of the disk drive data that were the subject of write requests involving the disk drive while the disk drive was being treated as being in a probation state, further comprising:
    if the disk drive requests to be put back online after the acceptable period of time has expired, making the disk drive subject to possible rebuilding of the entire disk drive's data.

15. A method for use in managing storage stability, comprising:
    detecting that a disk drive is requesting to be taken offline;
    beginning treating the disk drive as being in a probation state; and
    if within an acceptable period of time the disk drive requests to be put back online,
        stopping treating the disk drive as being in probation state, and
    rebuilding only any portions of the disk drive data that were the subject of write requests involving the disk drive while the disk was being treated as being in a probation state, further comprising:
    if the request does not fall within the number of such requests allowed within a tracking period, making the disk drive inaccessible.

* * * * *